United States Patent
Stuckler

(10) Patent No.: US 6,854,358 B1
(45) Date of Patent: Feb. 15, 2005

(54) COMPENSATING SHAFT ASSEMBLY FOR PISTON ENGINES

(75) Inventor: Johann Stuckler, Heiligenkreuz am Waasen (AT)

(73) Assignee: Steyr Powertrain AG & Co. KG, Haupstrasse (AT)

( * ) Notice: Subject to any disclaimer, the term of this patent is extended or adjusted under 35 U.S.C. 154(b) by 0 days.

(21) Appl. No.: 10/111,310

(22) PCT Filed: Oct. 19, 2000

(86) PCT No.: PCT/AT00/00274

§ 371 (c)(1),
(2), (4) Date: Jul. 25, 2002

(87) PCT Pub. No.: WO01/29447

PCT Pub. Date: Apr. 26, 2001

(30) Foreign Application Priority Data

Oct. 19, 1999 (AT) .............................. 728/99 U

(51) Int. Cl.[7] ................................................. F16C 3/20
(52) U.S. Cl. ................... 74/603; 74/591; 123/192.2
(58) Field of Search ............................... 74/573 R, 589, 74/590, 591, 603, 604; 123/192.2; 464/180

(56) References Cited

U.S. PATENT DOCUMENTS

| | | | | |
|---|---|---|---|---|
| 3,403,846 A | * | 10/1968 | Parker | 92/156 |
| 3,581,599 A | * | 6/1971 | Lee et al. | 74/603 |
| 4,480,607 A | * | 11/1984 | Tsai et al. | 123/192.2 |
| 4,515,027 A | * | 5/1985 | Baier et al. | 74/87 |
| 5,230,246 A | * | 7/1993 | Oetiker | 74/573 R |
| 5,293,684 A | * | 3/1994 | Fry | 29/888.08 |
| 5,535,643 A | * | 7/1996 | Garza | 74/603 |
| 5,791,309 A | * | 8/1998 | Yamazaki et al. | 123/192.2 |
| 6,135,727 A | * | 10/2000 | Dreiman et al. | 417/415 |
| 6,286,474 B1 | * | 9/2001 | Downs et al. | 123/192.2 |

* cited by examiner

*Primary Examiner*—David A. Bucci
*Assistant Examiner*—Timothy McAnulty
(74) *Attorney, Agent, or Firm*—Bachman & LaPointe, P.C.

(57) ABSTRACT

A balance shaft unit for internal combustion engines consists of at least one balance shaft (6, 7) supported in a balance casing (5) and counterweights (8) connected onto it. In order to achieve maximum precision, reliable fastening and minimum external dimensions at minimum manufacturing costs, the counterweight (8) is essentially a cylindrical ring with two end surfaces (61) normal to the axis and with a cutout (55) in the longitudinally central region, so that the counterweight consists of two ring parts (60, 61) abutting the two end surfaces (61) and an intermediate segmental part (62). One of the end surfaces (61) of the counterweight (8) forms, jointly with a machined surface (33) of the balance casing (5), a thrust bearing (32).

12 Claims, 6 Drawing Sheets

COMPENSATING SHAFT ASSEMBLY FOR PISTON ENGINES

BACKGROUND OF THE INVENTION

The invention relates to a balance shaft unit for reciprocating machines, consisting of a balance shaft supported in a balance casing and at least one counterweight fastened to the balance shaft. Balance shafts have the objective of balancing the inertia forces and moments occurring in reciprocating machines. They are preferentially employed in light, high-speed internal combustion engines, in particular in pairs in engines with four in-line cylinders, for balancing the second order inertia forces. In the latter application, they are usually driven from the crankshaft at double rotational speed, i.e. at up to more than 10,000 rpm.

This means extreme requirements with respect to precision and bearing arrangements. At the same time, they should be as light as possible, cheap to manufacture and assemble and demand as little installation space as possible in the crank case. Two different designs are fundamentally possible — the balance shaft is either produced in one piece with its counterweights or it is "built up", the counterweights being fastened onto the finished shaft.

The first possibility is for instance described in DE 37 05 346 A and the second in U.S. Pat. No. 4,425,821. The one-piece design is very expensive, demands maximum accuracy and leads, in the case of shafts with more than two bearings, to large bearing diameters for which, given the high rotational speeds, the lubrication technology cannot be successfully mastered. Precisely these reasons also prevent rolling contact bearings. On the other hand, built-up balance shafts have the main advantage of permitting smaller bearing diameters, it being however necessary to ensure sufficient shaft stiffness. In the case of more than two bearings, furthermore, single-piece casings with bearing bushes closed all round can also be used. It is, however, difficult to achieve maximum precision, reliable fastening and sufficient imbalance in the case of limited external dimensions. Thus in the case of the clamping connection of U.S. Pat. No. 4,425,821, for example, precision, minimum external diameter and connection strength is dubious.

The object of the invention is, therefore, to design a built-up balance shaft in such a way that, at minimum manufacturing cost, it meets the requirements of maximum precision, reliable fastening and minimum external dimensions.

SUMMARY OF THE INVENTION

The foregoing object is achieved according to the invention, wherein the counterweight is essentially a cylindrical ring with two end surfaces normal to the axis and with a cutout in the longitudinally central region, so that the counterweight consists of two ring parts abutting the two end surfaces and an intermediate segmental part. Trouser suspenders give the idea. The rings closed at the edge accept the tensile force, offer a firm connection with an accurate fit and load the shaft in the vicinity of its bearing arrangement so that no bending load occurs. They can be shrunk on in the most simple manner. The cutout in the longitudinally central region—it extends practically over half the periphery—permits a large mass eccentricity at a small external diameter. The segmental part surrounds the other half of the periphery. It is located at the tensile zone of the shaft loaded by bending and, by this means, increases its stiffness substantially. Preventing deformation in this way by increasing the resistance moment is of benefit to the shaft (reduced bending stresses) and the bearings (better support profile due to less sag). In consequence, the shafts can be produced with smaller diameter.

If the mass eccentricity which can be achieved in this way is not sufficient, the counterweight can—with only a small increase in the external diameter—have a thickening increasing the eccentric mass on the side facing away from the cutout.

In an advantageous embodiment, at least one of the end surfaces of the counterweight forms, jointly with a machined surface of the balance casing, a thrust bearing. By this means, a thrust bearing is also created without additional parts and which ensures precise axial positioning.

In the case of a balance shaft supported in a singlepart balance casing in light metal, the scope of the invention also includes the bearing surfaces of the friction bearing being formed in the balance casing itself. In this way, particularly accurate support is achieved with minimum complexity. The bearing surface is an uninterrupted cylindrical surface which is machined, with maximum accuracy, directly in the light metal casing. It has been found that purely hydrodynamic lubrication remains because of the small diameter of the shaft in the region.

In an advantageous embodiment, the counterweight is connected to the balance shaft by a beam welded seam in the cutout, which beam welded seam is produced on both sides at the intersection of the cutout plane with the balance shaft. This produces a particularly rapid and reliable connection, which is also completely distortion-free in the case of oppositely located welded seams, preferably manufactured by a laser.

In another advantageous embodiment, the balance shaft has at least a first transverse hole which is aligned with at least one second transverse hole in the counterweight, which two holes accept an essentially cylindrical connecting element, which can be a bolt, a dowel pin, a clamping sleeve or a rivet.

BRIEF DESCRIPTION OF THE DRAWINGS

The invention is described and explained below using illustrations. In these.

DETAILED DESCRIPTION

Figure 1:
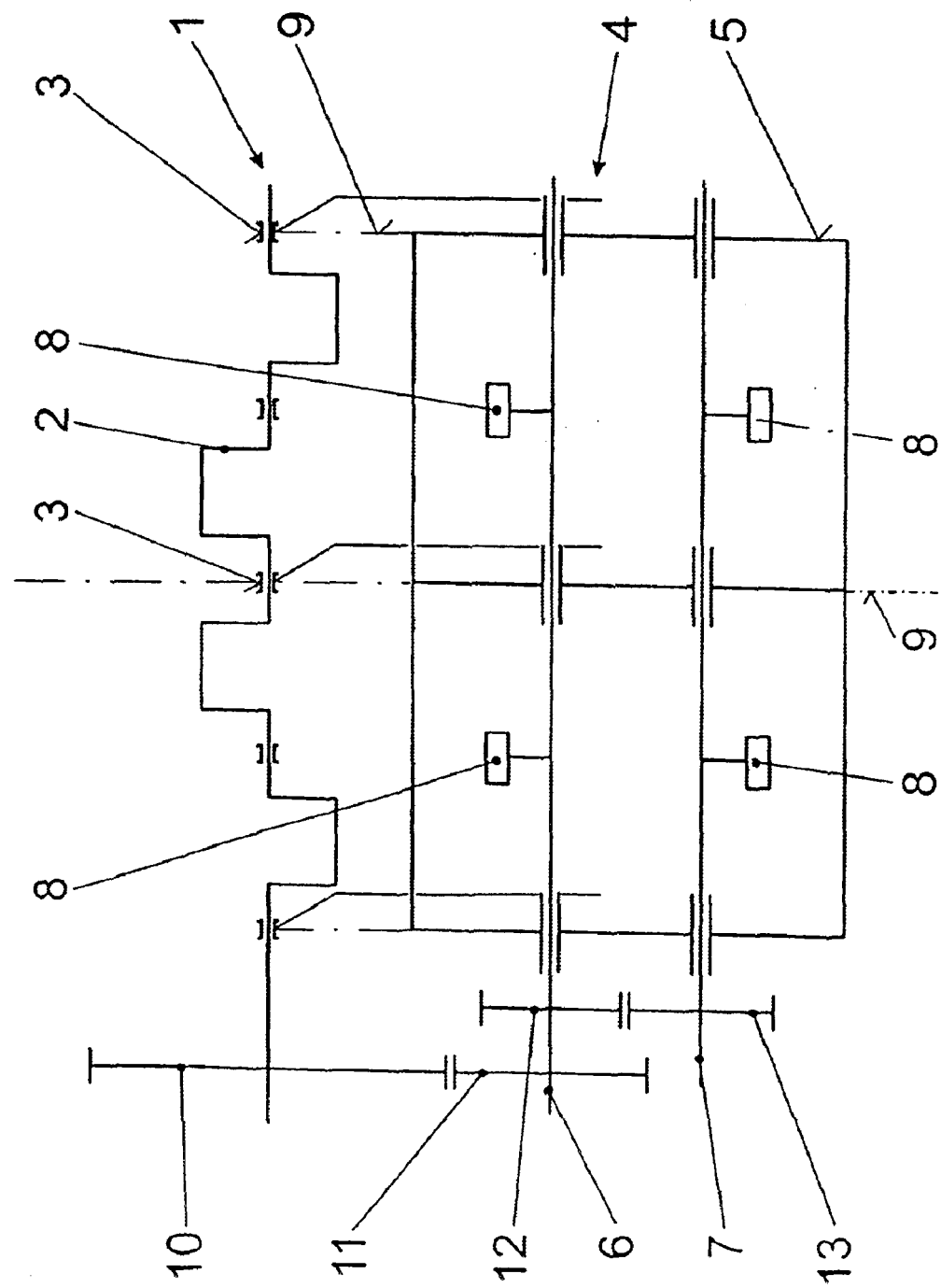
FIG. 1 shows an arrangement diagram of a unit according to the invention.

In FIG. 1, the reciprocating machine 1 is symbolized only by its crankshaft 2 and its main bearings 3. The main bearings 3 represent the complete engine block, which can be produced both in tunnel design and also with free bearing brackets. The mass balance appliance fastened to the engine block below the crankshaft 2 is generally designated by 4. It consists of a balance casing 5 and two balance shafts 6, 7, with counterweights 8, counter-rotating within the balance casing 5. The normal planes 9 through the main bearings 3 are indicated by dashed lines; the bearings of the mass balance appliance 4 are also located in these normal planes. The balance shafts 6, 7 are driven, via a drive gearwheel 11, by a gearwheel 10 torsionally connected to the crankshaft 2; the synchronizing wheels 12, 13 ensure equal counter-rotating rotational speed.

Figure 2:
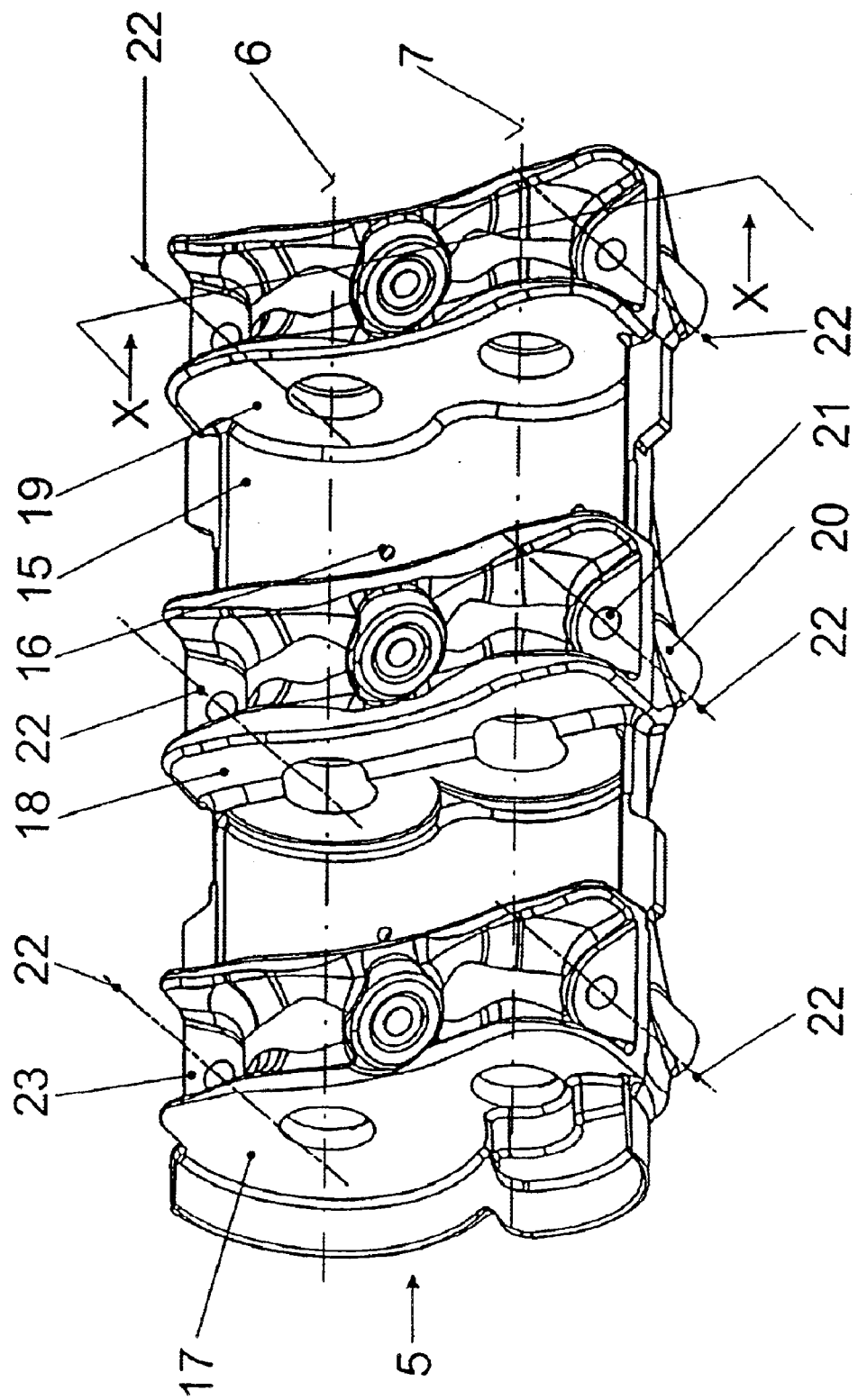
FIG. 2 shows, in plan view, an axonometric view of a balance casing as part of the unit according to the invention.

FIG. 2 shows the balance casing 5 which, in the embodiment example represented, is a part cast in light metal. It consists of a bottom shell 15 with oil drain holes 16 and a number of bearing brackets 17, 18, 19. Each bearing bracket has, on both its sides, a cast-on part 20 with a vertical hole 21 for, in each case, a threaded bolt 22 (which is only indicated) by means of which the balance casing 5 is bolted to the engine block. For this purpose, mounting surfaces 23 are formed in the surroundings of the holes 21. The assembled balance casing is connected by means of these mounting surfaces to the corresponding positions in the engine block, which is located in a common normal plane 9 with the bearing brackets 17, 18, 19. The connection, which is not actually represented, takes place either with the engine block transverse ribs formed by the bearing pedestal of the main bearing or with the bearing brackets of the main bearing or, in the case of a tunnel construction, on the latter.

Figure 3:
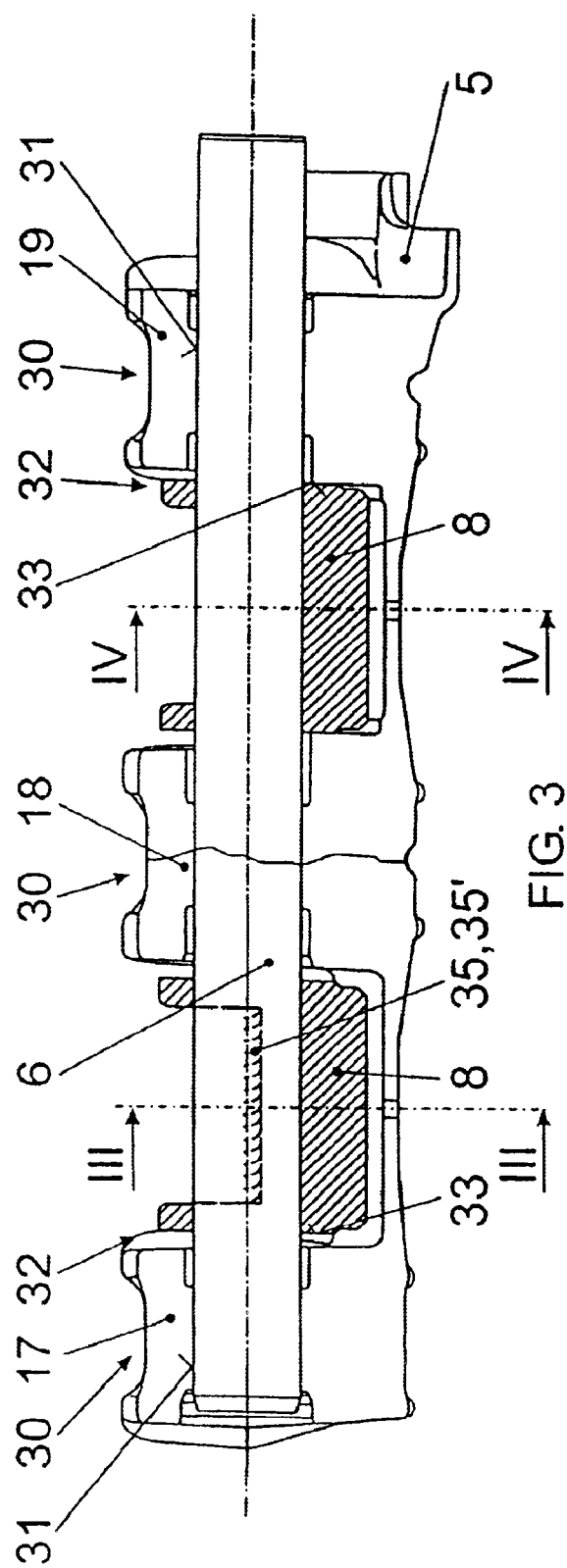
FIG. 3 shows a longitudinal section through a unit according to the invention in a first and a second embodiment.

FIG. 3 is a vertical longitudinal section through the first balance shaft 6 which, because of the special features of the design described, can be a simple, purely cylindrical shaft of constant diameter. The three bearing brackets 17, 18, 19 form friction bearings 30 for supporting the balance shaft 6. They exhibit the special feature that bearing surfaces 31 for the radial support are machined in the basic material of the balance casing 5 or the bearing brackets, without a bearing bush of its own being necessary. Thrust bearings 32 are configured on the two outer bearing brackets 17, 19, for which purpose fine-machined bearing surfaces 33 are likewise provided on the basic material.

Figure 4:
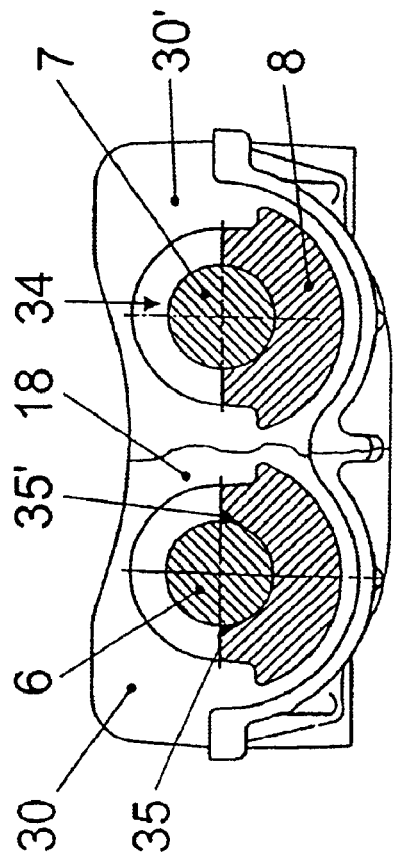
FIG. 4 shows a cross section along III—III and IV—IV in FIG. 3.

The counterweights 8 can be fastened onto the balance shafts 6, 7 in various ways. For this purpose, two different types of fastening are represented in each of the longitudinal sections of FIGS. 3, 5, 7 and the two balance shafts 6, 7 are correspondingly associated, in each case, to one embodiment and the other embodiment in FIGS. 4, 6 and 8. It is, however, obvious that the same type of fastening will normally be selected for both balance shafts and all the counterweights.

In FIG. 3, the counterweight 8 is simply shrunk (34) onto the balance shaft 6 on the right hand side; on the left-hand side, it is connected by means of two laser weld seams 35, 35', which are arranged diametrically opposite to one another and are longitudinally directed. With this arrangement of the weld seams and given the use of a closely focused high-energy beam, the balance shaft 6 remains distortion-free.

Figure 5:
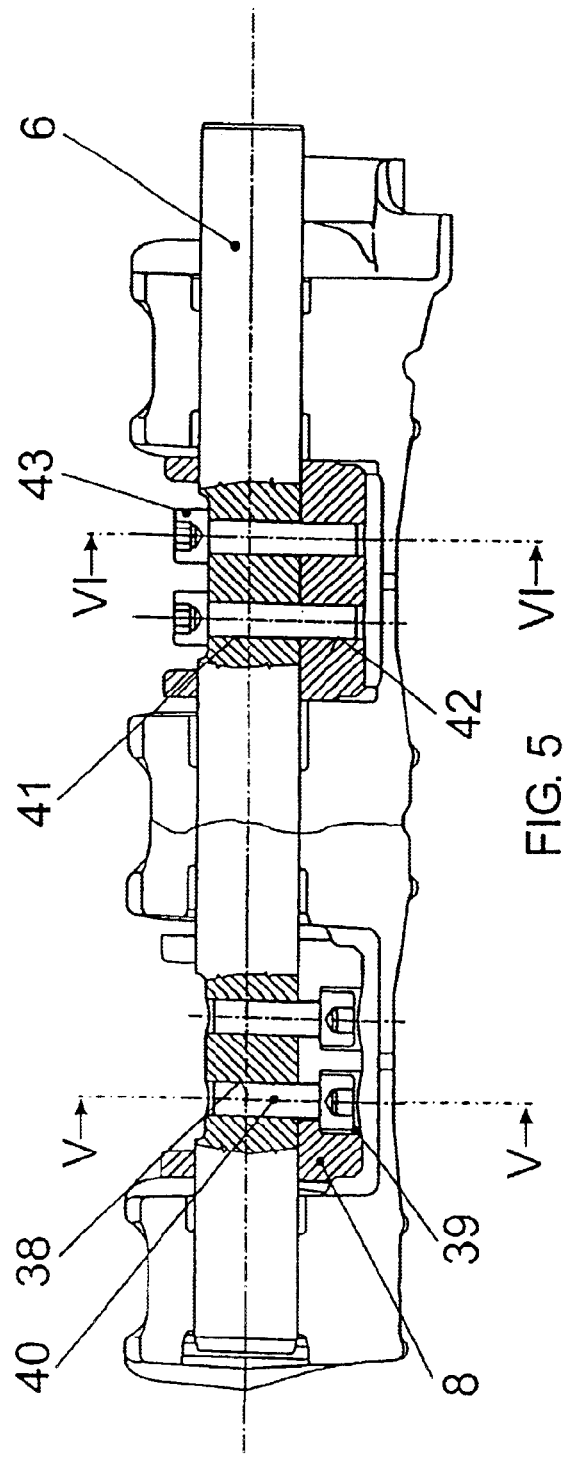
FIG. 5 shows a longitudinal section through a unit according to the invention in a third and a fourth embodiment.
Figure 6:
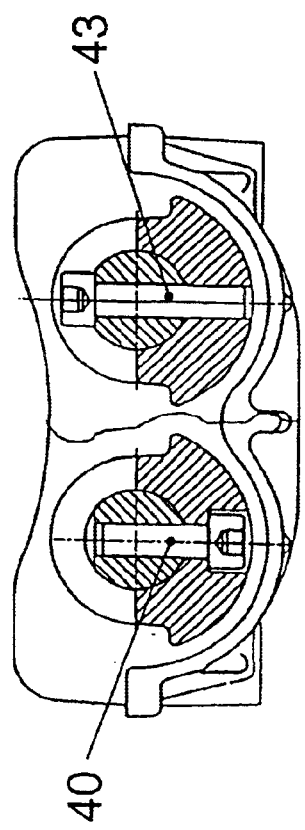
FIG. 6 shows a cross section along V—V and VI—VI in FIG. 5.

FIGS. 5 and 6 show two further types of connection between balance shaft 6 and counterweight 8. On the left-hand side, a threaded hole 38 is provided in the balance shaft 6 and a fitting hole with counterbore 39, through which the one or two fitting bolts 40 are screwed in from the side of the counterweight, is provided in the counterweight 8. On the right-hand side, the position is reversed—fitting bolts 43 are screwed in through a hole 41 in the balance shaft 6 and a threaded hole 42 in the counterweight 8.

Figure 7:
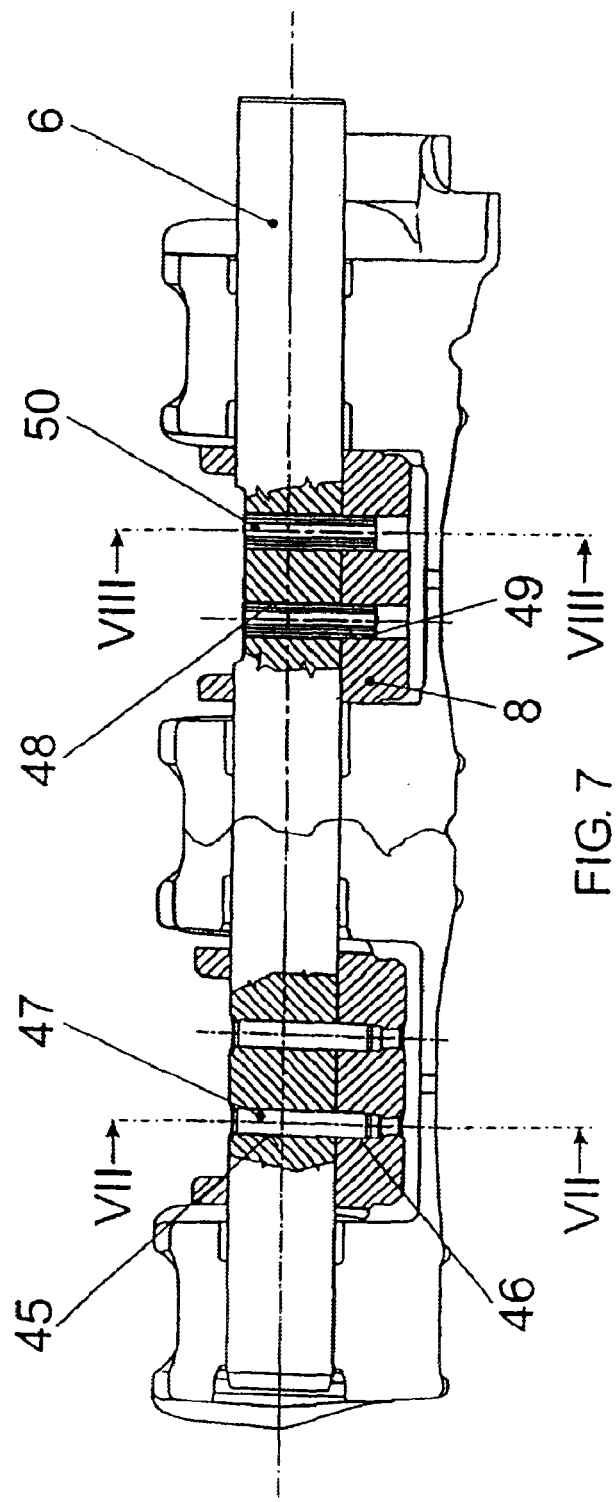
FIG. 7 shows a longitudinal section through a unit according to the invention in a fifth and a sixth embodiment.
Figure 8:
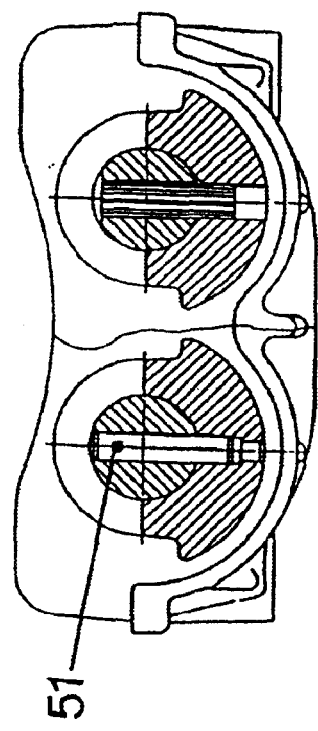
FIG. 8 shows a cross section along VII—VII and VIII—VIII in FIG. 7.

In FIGS. 7 and 8, the connection takes place by means of a fitting hole 45 in the balance shaft 6 and a preferably stepped fitting hole 46 in the counterweight 8, into which during assembly at least one dowel pin 47 (in this case there are two) is driven in. On the right-hand side, two fitting holes 48, 49 of the same diameter are provided into which, during assembly, two clamping bushes 50 are pushed; in an alternate embodiment rivets 51 are used.

Figure 9:
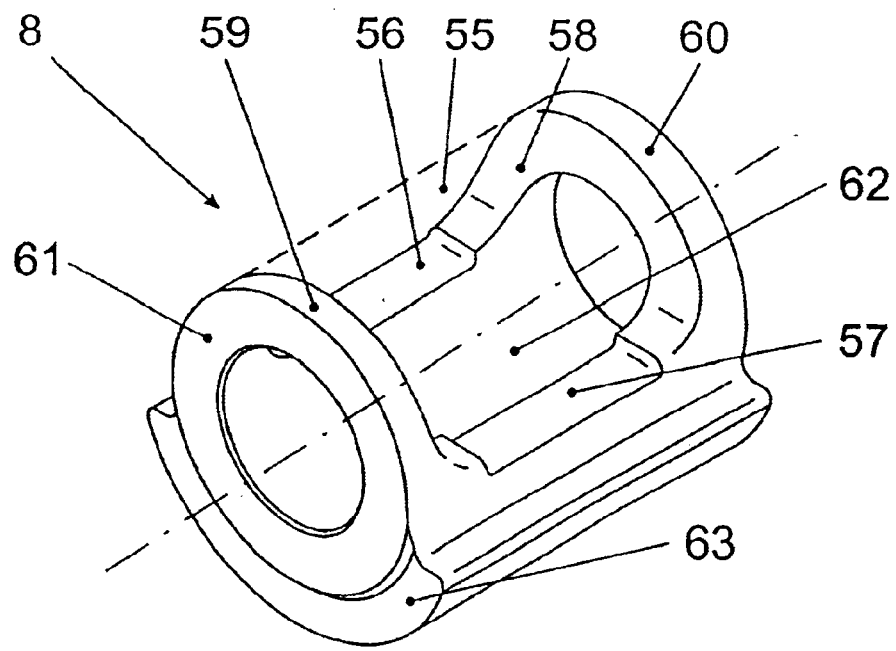
FIG. 9 shows an axonometric view of a counterweight according to the invention.

FIG. 9 shows the counterweight 8 in detail. Its basic shape is that of a cylindrical ring or of a hollow cylinder with a thick wall, which is indicated by a dashed line. It can be manufactured in various ways, possibly forged or as a lost-wax casting. Independently of this, the explanation of the shape refers to a lantern-type cutout 55, which takes place over a part of the length and approximately over half the periphery. The cutout 55 is bounded by two cutout planes 56, 57 and by lateral cutout surfaces 58. The cutout planes 56, 57 are essential where the connection to the shaft takes place by means of laser welding; in this case, the weld seam is located at the intersection line of the cutout planes 56, 57 with the cylinder of the balance shaft 6. In the longitudinal direction, and abutting on both sides of the cutout 55, two ring parts 59, 60 remain which are closed rings and accept the centrifugal forces and, in the case of a shrunk connection, also the peripheral forces generating the shrinkage stress. In each case, the ring parts 59, 60 have, on the outside, an end surface 61 which, in association with the bearing surface 33 of the bearing bracket 17, forms a thrust bearing 32. The cutout 55 extends approximately over a semicircle and, on the residual semicircle, there is a segmental part 62 which forms the eccentric mass. Because absolutely no material is located between the ring parts 59, 60 on the side of the cutout 55, it is possible to achieve a high degree of eccentricity with only small thickness of the segmental part 62. If this is not sufficient, it is additionally possible to form a thickening 63.

Figure 10:
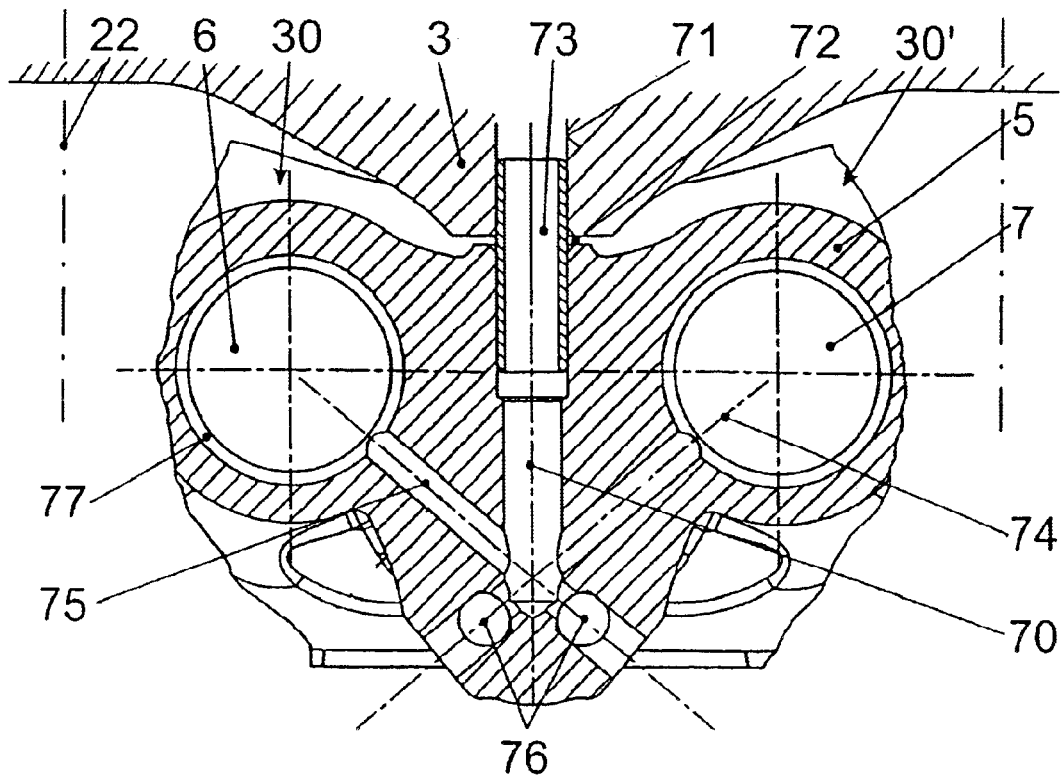
FIG. 10 shows an enlarged cross section along X—X in FIG. 2.

FIG. 10 mainly shows the oil supply. The main bearing 3, and therefore the complete engine block, are only indicated. The main bearing itself is located above the illustration and can no longer be seen. The balance casing 5 is also only partially represented and the threaded bolts 22, by means of which it is bolted onto the engine block or main bearings 3, are only indicated by a chain-dotted line. The section is taken in the bearing bracket 19 (FIG. 2). A first vertical lubricating duct 70 is located in the balance casing 5; it is parallel to the bolt holes 21 (FIG. 2) and can be drilled, with the latter, in one clamping operation. A second vertical lubricating duct 71 is provided in the main bearing 3 or engine block; this is aligned with the first lubricating duct but ends at a small distance away 72. By this means, any displacements caused by thermal expansion are accommodated in such a way that they cannot lead to any clamping of the balance casing 5. The two lubricating ducts 70, 71 are connected by an inserted sleeve 73. The first vertical lubricating duct 70 can be produced as a blind hole but leads to under the plane in which are the two balance shafts 6, 7. The connection to the bearings 30 is produced by plunge drillings 74, 75, which again lead upward. They intersect the lubricating duct 70 and can be drilled from underneath into the balance casing 5. They are closed towards the outside by pressed-in balls 76 and open into an oil distribution nut 70 of the friction bearing 30.

What is claimed is:

1. A balance shaft unit for an internal combustion engine comprising:

at least one balance shaft (6, 7) supported in a balance casing (5) along an axis on bearing surfaces (31) of a plurality of friction bearings (30) wherein the bearing surfaces (31) are formed in the balance casing (5) itself; at least one counterweight (8) fastened to the balance shaft (6, 7), the counterweight comprises two spaced apart ring parts (59, 60) extending normal to the axis and define therebetween an intermediate segmental part (62) and a cutout (55), the two spaced apart ring parts (59, 60) each have an end surface (61) wherein one of the end surfaces (61) on one of the ring parts (59, 60) form a thrust bearing (32) with a machined surface (33) of the balance casing (5) at a location proximate to bearing surface (31).

2. The balance shaft unit as claimed in claim 1, characterized in that the counterweight (8) is connected to the balance shaft (6, 7) by a high-energy welded seam (35, 35') in the cutout (55), which high-energy welded seam (35, 35') is produced on both sides at the intersection of a cutout plane (56, 57) with the balance shaft (6, 7).

3. A balance shaft unit for internal combustion engines, consisting of at least one balance shaft (6, 7) supported in a balance casing (5) and at least one counterweight (8) fastened to the balance shaft, characterized in that the counterweight (8) is essentially a cylindrical ring with two end surfaces (61) normal to the axis and with a cutout (55) in the longitudinally central region, so that the counterweight consists of two ring parts (60, 61) abutting the two end surfaces (61) and an intermediate segmental part (62), wherein the counterweight (8) is connected to the balance shaft (6, 7) by a high-energy welded seam (35, 35') in the cutout (55), which high-energy welded seam (35, 35') is produced on both sides at the intersection of a cutout plane (56, 57) with the balance shaft (6, 7).

4. The balance shaft unit as claimed in claim 3 or 1, characterized in that the counterweight (8) has a thickening (63) increasing the eccentric mass on the side facing away from the cutout (55).

5. The balance shaft unit as claimed in claim 3, which is supported in friction bearings (30) in the balance casing (5), characterized in that at least one of the end surfaces (61) of the counterweight (8) forms, jointly with a machined surface (33) of the balance casing (5), a thrust bearing (32).

6. The balance shaft unit as claimed in claim 5, the balance shaft being supported in a balance casing (5) in light metal, characterized in that the bearing surfaces (31) of the friction bearing are formed in the balance casing (5) itself.

7. The balance shaft unit as claimed in claims 6 or 1, wherein the bearing surfaces are fine-machined bearing surfaces.

8. The balance shaft unit as claimed in claim 3 or 1, characterized in that the balance shaft (6, 7) has at least a first transverse hole (38; 41; 45; 48), which is aligned with at least one second transverse hole (39; 42; 46; 49) of the counterweight (8), which two holes accept an essentially cylindrical connecting element (40; 43; 47; 50).

9. The balance shaft unit as claimed in claim 8, characterized in that the cylindrical connecting element is a bolt (40).

10. The balance shaft unit as claimed in claim 8, characterized in that the cylindrical connecting element is a dowel pin (47).

11. The balance shaft unit as claimed in claim 8, characterized in that the cylindrical connecting element is a clamping sleeve (50).

12. The balance shaft unit as claimed in claim 8, characterized in that the cylindrical connecting element is a rivet.

* * * * *